(12) United States Patent
Missotten et al.

(10) Patent No.: US 12,501,852 B2
(45) Date of Patent: Dec. 23, 2025

(54) BELT-TYPE CUTTING SYSTEM FOR CUTTING CROPS IN A FIELD

(71) Applicant: CNH Industrial America LLC, New Holland, PA (US)

(72) Inventors: Bart M.A. Missotten, Herent (BE); Jasper Vanlerberghe, Aartrijke (BE); Sam Reubens, Sint-Michiels (BE); Lucas Deruyter, Hooglede-Gits (BE); Frederik Tallir, Esen (BE); Dré W.J. Jongmans, AG Klundert (NL); Sahand Hajshekoleslami, Izegem (BE); Pieter Van Overschelde, Sint-Andries (BE)

(73) Assignee: CNH Industrial America LLC, New Holland, PA (US)

( * ) Notice: Subject to any disclaimer, the term of this patent is extended or adjusted under 35 U.S.C. 154(b) by 861 days.

(21) Appl. No.: 17/841,936

(22) Filed: Jun. 16, 2022

(65) Prior Publication Data
US 2022/0400608 A1 Dec. 22, 2022

(30) Foreign Application Priority Data
Jun. 17, 2021 (EP) .................................... 21180162

(51) Int. Cl.
*A01D 34/14* (2006.01)
*A01D 34/83* (2006.01)
(52) U.S. Cl.
CPC ........... *A01D 34/14* (2013.01); *A01D 34/831* (2013.01)
(58) Field of Classification Search
CPC .............................. A01D 34/14; A01D 34/831
See application file for complete search history.

(56) References Cited

U.S. PATENT DOCUMENTS

| 16,968 A | 4/1857 | Comfort, Jr. |
| 188,788 A | 3/1877 | Farnum |

(Continued)

FOREIGN PATENT DOCUMENTS

| CH | 520462 A | 10/1972 |
| CN | 2095534 U | 2/1992 |

(Continued)

OTHER PUBLICATIONS

Extended European Search Report for European Application No. 211 801 62.6, dated Dec. 16, 2021, 9 pages.

(Continued)

*Primary Examiner* — Abigail A Risic
(74) *Attorney, Agent, or Firm* — Buchanan Ingersoll & Rooney PC

(57) ABSTRACT

The cutting system includes knives attached to a continuously moving belt-type carrier. The carrier motion moves the knives past stationary counterknife fingers. Each knife is pivotably connected to the platform portion of a support bracket having also a wall portion that is fixed to the belt-type carrier. The knife is furthermore coupled to the bracket by a reversible force coupling that maintains the knife in a forwardly oriented operational position when the knife is subjected to lateral forces which exert a torque on the knife that remains below a predefined limit, encountered when the knife is cutting stalks or meeting small obstructions. When the knife is subjected to lateral forces resulting in a torque above the predefined limit, the force coupling is configured to be disengaged in a reversible manner, enabling the knife to pivot about a rotation axis towards a nonoperational position.

14 Claims, 6 Drawing Sheets

(56) References Cited

U.S. PATENT DOCUMENTS

| | | | |
|---|---|---|---|
| 255,688 A | 3/1882 | Spottswood | |
| 323,880 A | 8/1885 | Owen | |
| 369,096 A | 8/1887 | Brown | |
| 490,781 A | 1/1893 | Burkill et al. | |
| 490,782 A | 1/1893 | Beekman | |
| 598,848 A | 2/1898 | Boice | |
| 664,670 A | 12/1900 | Oldham | |
| 671,085 A | 4/1901 | Knowles | |
| 673,389 A | 5/1901 | Denton | |
| 762,104 A | 6/1904 | Teeters et al. | |
| 764,567 A | 7/1904 | Ekel | |
| 779,994 A | 1/1905 | Downing | |
| 840,518 A | 1/1907 | Rodman | |
| 957,428 A | 5/1910 | Lithander | |
| 1,053,289 A | 2/1913 | Jacobs et al. | |
| 1,082,659 A | 12/1913 | Swanson | |
| 1,258,671 A | 3/1918 | Greenfield | |
| 1,370,352 A | 3/1921 | Parmley | |
| 1,604,726 A * | 10/1926 | Stauter | A01D 34/14 56/293 |
| 1,623,433 A | 4/1927 | Newton | |
| 1,627,644 A | 5/1927 | Hejma | |
| 1,731,434 A * | 10/1929 | Paradise | A01D 34/14 56/307 |
| 2,063,067 A | 12/1936 | Waller | |
| 2,199,642 A | 5/1940 | Maninger | |
| 2,282,238 A | 5/1942 | Newton | |
| 2,291,182 A | 7/1942 | Blalack | |
| 2,304,174 A | 12/1942 | Hurst | |
| 2,484,071 A | 10/1949 | Brauer | |
| 2,526,821 A | 10/1950 | Jones | |
| 2,533,691 A | 12/1950 | Remonte | |
| 2,571,811 A | 10/1951 | Andrews | |
| 2,619,786 A | 12/1952 | Ream | |
| 2,640,309 A | 6/1953 | Benson | |
| 2,654,208 A | 10/1953 | Pasturczak | |
| 2,728,181 A * | 12/1955 | Carpenter | A01D 34/831 56/13.4 |
| 2,767,543 A | 10/1956 | Ream | |
| 2,772,533 A | 12/1956 | Shibley, Jr. | |
| 2,790,293 A | 4/1957 | Crotty | |
| 2,860,477 A | 11/1958 | Chambliss | |
| 2,948,099 A | 8/1960 | Johnson | |
| 3,029,584 A | 4/1962 | Johnson | |
| 3,054,247 A | 9/1962 | Roesler | |
| 3,073,100 A | 1/1963 | Kingsley | |
| 3,106,053 A | 10/1963 | Fairbairn | |
| 3,389,539 A | 6/1968 | Wilhelmus | |
| 3,391,522 A | 7/1968 | Zweegers | |
| 3,397,524 A | 8/1968 | Hofer et al. | |
| 3,401,512 A | 9/1968 | Pool et al. | |
| 3,401,513 A | 9/1968 | Pool et al. | |
| 3,412,538 A | 11/1968 | Calder | |
| 3,431,714 A | 3/1969 | Bouet | |
| 3,444,676 A | 5/1969 | Hale et al. | |
| 3,447,291 A * | 6/1969 | Guetterman | A01D 34/63 56/295 |
| 3,455,094 A | 7/1969 | Gorham | |
| 3,469,378 A | 9/1969 | Heesters et al. | |
| 3,488,931 A * | 1/1970 | Matthews | A01D 34/833 56/16.7 |
| 3,490,214 A | 1/1970 | Cullimore | |
| 3,490,215 A | 1/1970 | Chapman et al. | |
| 3,507,102 A | 4/1970 | Kline et al. | |
| 3,508,388 A | 4/1970 | Buchholz | |
| 3,509,704 A | 5/1970 | Tenzman | |
| 3,514,934 A | 6/1970 | Cassady | |
| 3,517,494 A | 6/1970 | Beusink et al. | |
| 3,521,437 A | 7/1970 | Risser et al. | |
| 3,538,690 A | 11/1970 | Hinks et al. | |
| 3,545,188 A * | 12/1970 | Locati | A01D 34/831 56/292 |
| 3,550,360 A | 12/1970 | van der Lely | |
| 3,555,798 A | 1/1971 | Eder | |
| 3,561,202 A | 2/1971 | Tupper | |
| 3,566,592 A | 3/1971 | Jerman et al. | |
| 3,572,019 A | 3/1971 | Glunk et al. | |
| 3,594,998 A | 7/1971 | Graversen et al. | |
| 3,600,880 A | 8/1971 | Woods | |
| 3,608,287 A | 9/1971 | Gaertner | |
| 3,623,300 A | 11/1971 | König et al. | |
| 3,641,751 A | 2/1972 | Locati | |
| 3,654,750 A | 4/1972 | van der Lely | |
| 3,656,286 A | 4/1972 | Glunk et al. | |
| 3,657,868 A | 4/1972 | Cousino | |
| 3,662,529 A | 5/1972 | Glunk et al. | |
| 3,672,136 A | 6/1972 | Peacock et al. | |
| 3,673,779 A | 7/1972 | Scarnato et al. | |
| 3,681,901 A | 8/1972 | Buchele et al. | |
| RE27,511 E * | 10/1972 | Locati | A01D 34/831 56/292 |
| 3,698,167 A * | 10/1972 | Hurlburt | A01D 34/831 56/291 |
| 3,699,757 A * | 10/1972 | Hulburt | A01D 34/831 56/291 |
| 3,720,049 A | 3/1973 | Tupper | |
| 3,722,195 A | 3/1973 | Hurlburt | |
| 3,831,358 A * | 8/1974 | Marsh | F16G 5/00 15/80 |
| 3,896,611 A * | 7/1975 | Lingenfelter | A01D 45/023 56/119 |
| 4,070,810 A | 1/1978 | Brakke | |
| 4,270,339 A | 6/1981 | Wolfe | |
| 4,550,554 A | 11/1985 | Lundahl et al. | |
| 4,563,867 A | 1/1986 | Bokon | |
| 4,656,819 A | 4/1987 | Pearson | |
| 4,719,743 A | 1/1988 | Bokon | |
| 4,815,265 A | 3/1989 | Guinn et al. | |
| 5,005,342 A | 4/1991 | Lundahl et al. | |
| 5,644,904 A | 7/1997 | Olinger | |
| 5,732,539 A | 3/1998 | Loftus | |
| 5,845,474 A | 12/1998 | Loftus | |
| 5,875,624 A | 3/1999 | Olinger | |
| 6,446,422 B1 | 9/2002 | Bahr | |
| 6,925,790 B1 | 8/2005 | Krone et al. | |
| 8,875,481 B2 | 11/2014 | Roberg | |
| 9,943,034 B2 | 4/2018 | Kalverkamp et al. | |
| 2003/0010009 A1 | 1/2003 | Bickel et al. | |
| 2006/0123762 A1 | 6/2006 | Ehlert et al. | |
| 2012/0067018 A1 | 3/2012 | Roberg | |
| 2015/0305233 A1* | 10/2015 | Surmann | A01D 34/14 56/10.1 |
| 2020/0260641 A1* | 8/2020 | Schmidt | A01D 34/14 |

FOREIGN PATENT DOCUMENTS

| | | |
|---|---|---|
| CN | 91201617 U | 2/1992 |
| CN | 1200232 A | 12/1998 |
| CN | 2304236 Y | 1/1999 |
| CN | 2312567 Y | 4/1999 |
| CN | 2334153 Y | 8/1999 |
| CN | 1299583 A | 6/2001 |
| CN | 2473874 Y | 1/2002 |
| CN | 2544510 Y | 4/2003 |
| CN | 101151954 A | 4/2008 |
| CN | 201585260 U | 9/2010 |
| CN | 201585261 U | 9/2010 |
| CN | 201601981 U | 10/2010 |
| CN | 201674794 U | 12/2010 |
| CN | 201781776 U | 4/2011 |
| CN | 102067764 A | 5/2011 |
| CN | 102090203 A | 6/2011 |
| CN | 201869561 U | 6/2011 |
| CN | 202197556 U | 4/2012 |
| CN | 102428794 A | 5/2012 |
| CN | 205249809 U | 5/2016 |
| CN | 108093842 A | 6/2018 |
| CZ | 1724 U1 | 4/1994 |
| DE | 1582476 A1 | 6/1970 |
| DE | 2100984 A1 | 12/1971 |
| DE | 2816967 A1 | 10/1979 |
| DE | 3046864 A1 | 7/1982 |

(56) References Cited

FOREIGN PATENT DOCUMENTS

| | | |
|---|---|---|
| DE | 3427900 A1 | 1/1986 |
| DE | 3819227 A1 | 12/1989 |
| DE | 3927592 A1 | 2/1991 |
| DE | 19803517 A1 | 8/1999 |
| DE | 102005025319 A1 | 12/2006 |
| DE | 102013106197 A1 | 12/2014 |
| EP | 238827 A1 | 9/1987 |
| EP | 271672 A2 | 6/1988 |
| EP | 299224 A1 | 1/1989 |
| EP | 328080 A2 | 8/1989 |
| EP | 0443079 A2 | 8/1991 |
| EP | 0974255 A1 | 1/2000 |
| EP | 1419688 A1 | 5/2004 |
| EP | 1507451 B1 | 2/2005 |
| EP | 1543713 A1 | 6/2005 |
| EP | 1419688 B1 | 9/2006 |
| EP | 1543713 B1 | 4/2008 |
| EP | 2430900 B1 | 3/2012 |
| FR | 540622 A | 7/1922 |
| FR | 757779 A | 1/1934 |
| FR | 989121 A | 9/1951 |
| FR | 1011968 A | 7/1952 |
| FR | 1099229 A | 8/1955 |
| FR | 1492261 | 8/1967 |
| FR | 2075464 | 10/1971 |
| GB | 236846 A | 7/1925 |
| GB | 282978 A | 1/1928 |
| GB | 407575 | 3/1934 |
| GB | 407575 A | 3/1934 |
| GB | 563135 A | 8/1944 |
| GB | 571803 U | 9/1945 |
| GB | 848018 | 9/1960 |
| JP | S52112421 U | 8/1977 |
| JP | S52119430 U | 9/1977 |
| JP | S53102419 U | 8/1978 |
| JP | S57125237 U | 8/1982 |
| JP | S5850621 U | 4/1983 |
| JP | S61125225 U | 8/1986 |
| JP | S6331735 U | 3/1988 |
| JP | H0435721 U | 3/1991 |
| JP | H0399920 U | 10/1991 |
| JP | H05292822 A | 11/1993 |
| JP | H0619420 U | 3/1994 |
| JP | 2000-83440 | 3/2000 |
| JP | 2005-312394 | 11/2005 |
| JP | 2007-43962 | 2/2007 |
| JP | 2008-79540 | 4/2008 |
| JP | 2008-136387 | 6/2008 |
| JP | 2010-4786 | 1/2010 |
| JP | 4484574 B2 | 6/2010 |
| JP | 4861113 B2 | 1/2012 |
| JP | 5290639 | 9/2013 |
| NL | 6515224 | 5/1967 |
| RU | 2299549 C1 | 5/2007 |
| RU | 2461174 C1 | 9/2012 |
| RU | 2478276 C1 | 4/2013 |
| RU | 2565025 C1 | 10/2015 |
| SU | 48419 | 5/1937 |
| SU | 1099888 A | 6/1984 |
| SU | 1130236 A | 12/1984 |
| SU | 1255076 A1 | 9/1986 |
| SU | 1428258 A1 | 10/1988 |
| SU | 1486086 A1 | 6/1989 |
| WO | WO 96/32832 A1 | 10/1996 |
| WO | 200105217 A1 | 1/2001 |
| WO | 200105218 A1 | 1/2001 |

OTHER PUBLICATIONS

Farm Show Magazine—Oct. 2, 2018—The Best Stores About Made-It-Myself Shop Inventions, Farming and Gardening Tips, Time-Saving Tricks & the Best Farm Shop Hacks, DIY Farm Projects, Tips on Boosting Your Farm Income, Time-Saving Farming Advise, Farming Tractors and Agriculture Equipment Reviews.
"Theoretical and Experimental Analysis of a Continuous Blade Cutting System for Leafy Vegetables" by D. Brown and J. L. Glancey; 2007 Transactions of the ASABE—vol. 50(3): 803-813.
Whatever Happened to Chainsaw-Type Cutterbars? Farm Show Magazine, www.farmshow.com.
Chain-Type Cutterbar—2002—vol. #26, Issue #2, p. 20 (https://www.farmshow.com/a_article.php?aid=15241).
"A Balanced High Speed Rotary Sickle for Cutting and Trajecting Plants" by B. L. Bledsoe and Jay G. Porterfield; Transactions of the ASAE 1971; pp. 818-824.
"A Compound Helical Cutterbar—Design and Field Testing" by W. E. Coates, thesis submitted to the Faculty of the Graduate College of the Oklahoma State University in partial fulfillment of the requirements for the Degree of Doctor of Philosophy, Jul. 1973, 175 pages.
"A Compound Helical Cutterbar—Design and Field Testing" by W. E. Coates and Jay G. Porterfield; Transations of the ASAE 1975, pp. 17-19.
"Elliptical Cutter for Forage Harvesting" by John R. Durfee et al.; Transactions of the ASAE 1977; pp. 635-639.
"Impact Cutting Behaviour of Forage Crops—I. Mathematical Models and Laboratory Tests" by D. M. McRandal and P. B. McNulty; The British Society for Research in Agricultural Engineering 1978; pp. 313-328.
"The Design and Experimental Analysis of a Rotary Sickle for Cutting and Trajecting Plant Stems" by Bobby Lynn Bledsoe Submitted to the Facility of the Graduate College of the Oklahoma State University in Partial Fulfillment of the Requirements for the Degree of Doctor of Philosophy, Aug. 1969.
"Cutting Energy and Force as Required by Pigeon Pea Stems" by Atul R. Dange, S. K. Thakare and I. Bhaskara Rao; Journal of Agricultural Technology 2011 vol. 7(6): 1485-1493 (available at http://www.ijat-aatsea.com).
"Effect of Cutting Speed on Cutting Torque and Cutting Power of Varying Kenaf-Stem Diameters at Different Moisture Contents"; Nov. 2015; ResearchGate; pp. 549-561 (https://www.researchgate.net/publication/28308235).
"Effect of Knife Angle and Velocity on the Energy Required to Cut Cassava Tubers" by R. Visvanathan; V. V. Breenarayanan; K. R. Swaminathan; College of Agricultural Engineering, Tamil Nadu Agricultural University; J. agric. Engng Res. (1996) 64, 99-102.
"Effect of Knife Velocity on Cutting Energy and Efficiency during Impact Cutting of Sorghum Stalk" by Y. D. Yiljep and U.S. Mohammed, Agricultural Engineering International: the CIGR EJournal. Manuscript PM 05 004. vol. VII. Dec. 2005; pp. 1-10.

\* cited by examiner

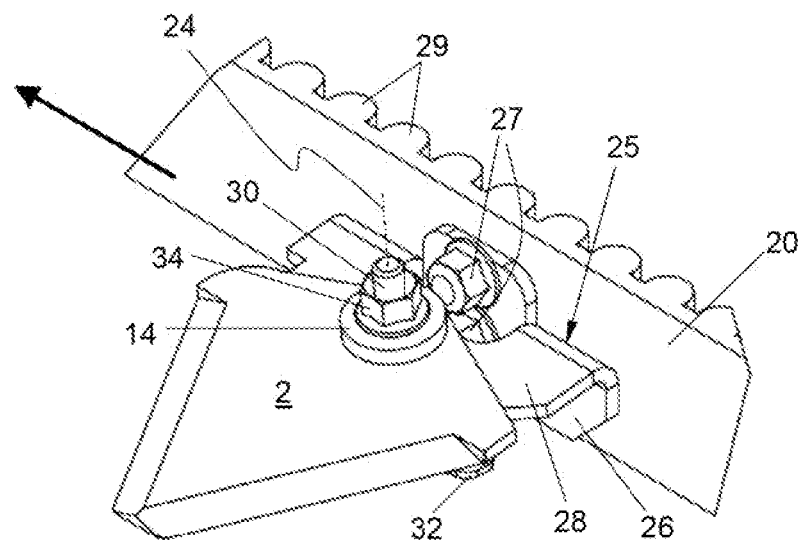
FIG. 4a
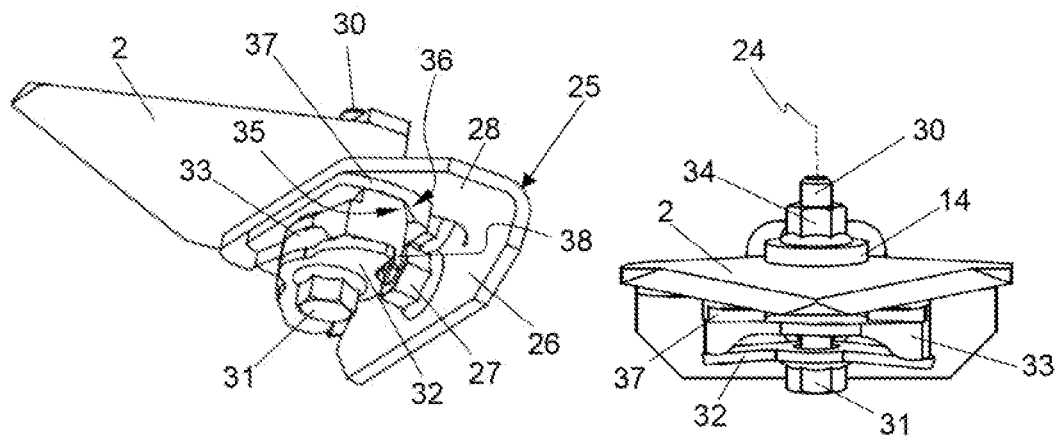
FIG. 4b      FIG. 4c
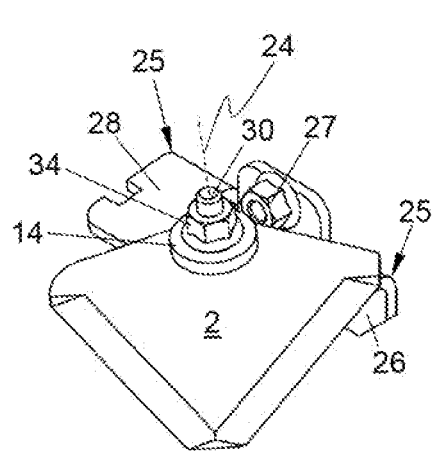    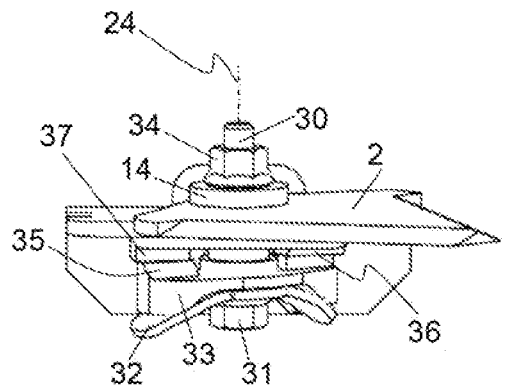
FIG. 5a      FIG. 5b

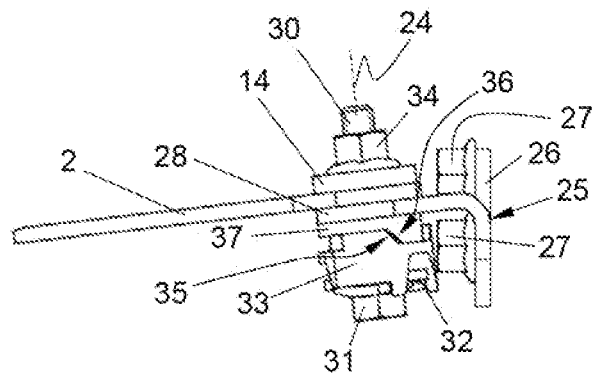
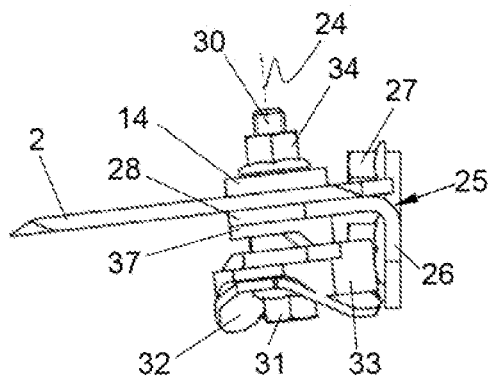
FIG. 6a  FIG. 6b
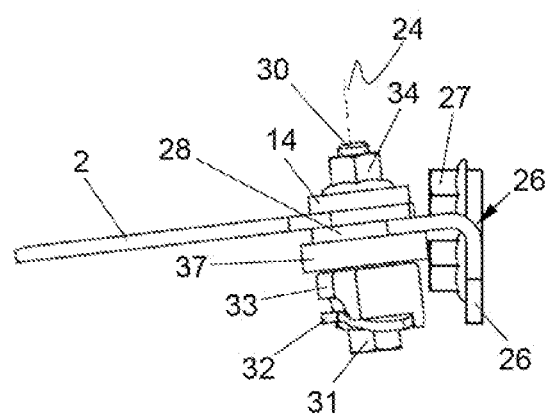
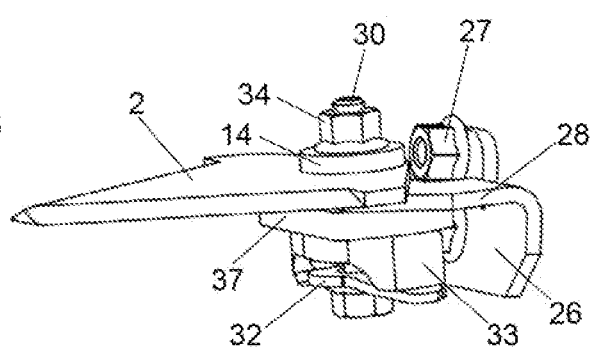
FIG. 7a  FIG. 7b
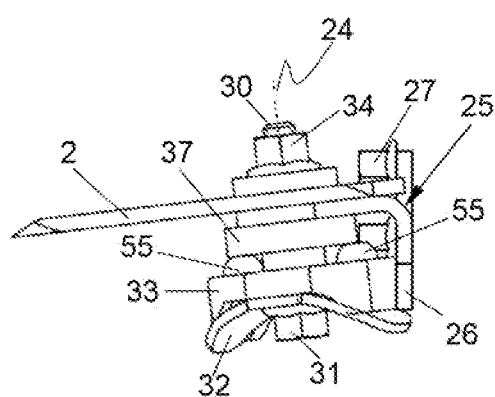
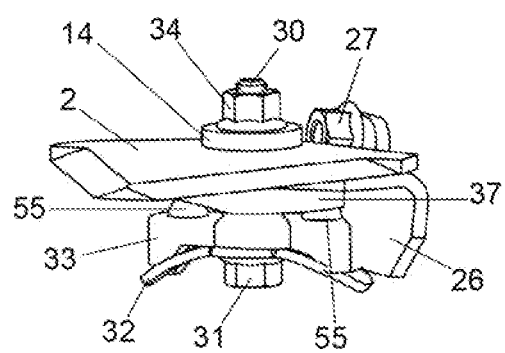
FIG. 7c  FIG. 7d

BELT-TYPE CUTTING SYSTEM FOR CUTTING CROPS IN A FIELD

CROSS-REFERENCE TO RELATED APPLICATION

This application claims priority to European Application No. 21180162.6, filed Jun. 17, 2021, the content of such application being incorporated by reference herein in its entirety.

FIELD OF THE INVENTION

The present invention is related to agricultural implements, such as harvesters, tractors or mowers equipped with a cutter bar and a set of knives moving sideways relative to the cutterbar to cut off crop stalks close to the ground level. This type of knife-cutterbar combination is commonly used in combine harvesters.

BACKGROUND OF THE INVENTION

In a combine harvester, the cutter bar and knives are part of the combine header mounted at the front of the machine and configured to cut and collect crops along a wide path, the width thereof corresponding to the length of the header. In most harvesters known today, the knives are configured to undergo a reciprocating movement relative to the cutterbar, the latter being equipped with stationary fingers acting as counterknives. The reciprocating movement of the knives is actuated by a laterally placed actuator such as a wobble box mechanism. While this is a well-known and well-tested cutting method, the reciprocating motion has a number of disadvantages. The system is subject to vibrations and high peak forces which are liable to cause premature wear of the knives and/or the counterknives or of the actuating mechanism itself. These forces may become excessive, especially in the increasingly large harvesters in use today.

A known alternative to the reciprocating knives is the so-called belt cutter or loop-knife approach, in which the knives are mounted on a continuously moving belt-type carrier, moving in one direction along the front edge of the header. The belt is guided by a set of pulleys, one of which is actively rotated at a given speed. The knives move in one direction, once again relative to stationary counterknives along the front side of the carrier's path, and move in the opposite direction (i.e. in a loop) along the back side of said path. While vibrations and peak forces are much less of an issue here, the loop-knife solution is vulnerable to other problems. The main problem is the breaking of knives when an obstruction is encountered in the field, such as a large stone or other solid object. As illustrated by patent publication document U.S. Pat. No. 3,699,757, it has been proposed to mount the knives on the belt by interposing a resilient member that allows a degree of flexibility to the knife when it encounters an obstruction. However such a solution is not sufficiently dependable, especially when impact forces are higher, as for example in the case of a large combine harvester where the knives are larger and moving at higher speeds.

SUMMARY OF THE INVENTION

The invention is related to a cutting system and to an agricultural implement such as a combine harvester equipped therewith, as described in the appended claims. The cutting system of the invention is of the above-described loop-knife type, with knives attached to a continuously moving belt-type carrier. The term 'belt-type carrier' includes a belt as such, or a chain or other equivalent carrier. A preferred embodiment includes a belt with a planar outer side surface to which the knives are attached, and teeth on its inner side surface, the teeth interacting with pulleys for guiding and driving the belt motion. Such a belt is also called a toothed belt or timing belt. Such a belt can include a matrix made of rubber or polyurethane reinforced with steel cords and/or synthetic fibres, tows or yarns containing aramid. The belt motion moves the knives past stationary counterknife fingers as the cutting system is driven through a field of crop stalks, which are cut by the interaction between the knives and counterknives. In a cutting system of the invention, each knife is pivotably connected to the platform portion of a support bracket having also a wall portion that is fixed to the belt-type carrier. The knife is furthermore coupled to the bracket by a reversible force coupling that maintains the knife in a forwardly oriented operational position when the knife is subjected to lateral forces which exert a torque on the knife that remains below a predefined limit, encountered when the knife is cutting stalks or meeting small obstructions. Below this limit, the force coupling is engaged with the knives in the forwardly oriented position, and the forces are insufficient to disengage the coupling. However when the knife is subjected to lateral forces resulting in a torque above the predefined limit, for example when encountering a larger obstruction, the force coupling is configured to be disengaged, enabling the knife to pivot about a rotation axis towards a non-operational position. The force coupling is reversible, meaning that after the disengagement, the knife may be pivoted back manually or automatically by a suitable reset mechanism, thereby returning to the operational position by re-engaging the force coupling. The invention thereby prevents breakage of the knives due to large obstructions, enabling a longer lifetime of the knives and of the cutting system as a whole.

The force coupling may comprise a spring-operated retention mechanism. A number of embodiments include a leaf spring configured to exert a retaining force on a retention block that is non-rotatably connected to the knife, and that is locked via a releasable interface to the underside of the bracket's platform portion or to a holding element fixed thereto. The interface may include slanted clutch portions or releasable latch pins. Another alternative is to apply an overcenter mechanism for maintaining the knives in the operational position unless a lateral force exerts a torque above the predefined limit. Other alternatives for the force coupling are possible within the scope of the invention.

BRIEF DESCRIPTION OF THE FIGURES

FIGS. 4a to 4c illustrate the attachment of one knife to the moveable belt in accordance with a first embodiment, with the knife in the normal operational position.

FIGS. 5a and 5b illustrate the knife of the first embodiment, in the pivoted position.

FIGS. 6a and 6b are side views of the knife of the first embodiment, respectively in the operational position and in the pivoted position.

FIGS. 7a to 7d illustrate a knife attached to the belt by an attachment mechanism in accordance with a second embodiment of the invention.

DETAILED DESCRIPTION OF PREFERRED EMBODIMENTS OF THE INVENTION

Preferred embodiments will now be described with reference to the drawings. The detailed description is not limiting the scope of the invention, which is defined only by the appended claims. The invention is described in the context of a combine harvester, but is not limited to this particular context, as will be explained further. The terms 'front' and 'back' or 'rear' are referenced to the front and back side of a combine harvester. The 'forward direction' of the combine harvester refers not to a single geometrical axis but to the general direction from the rear of the vehicle to the front.

Figure 1:
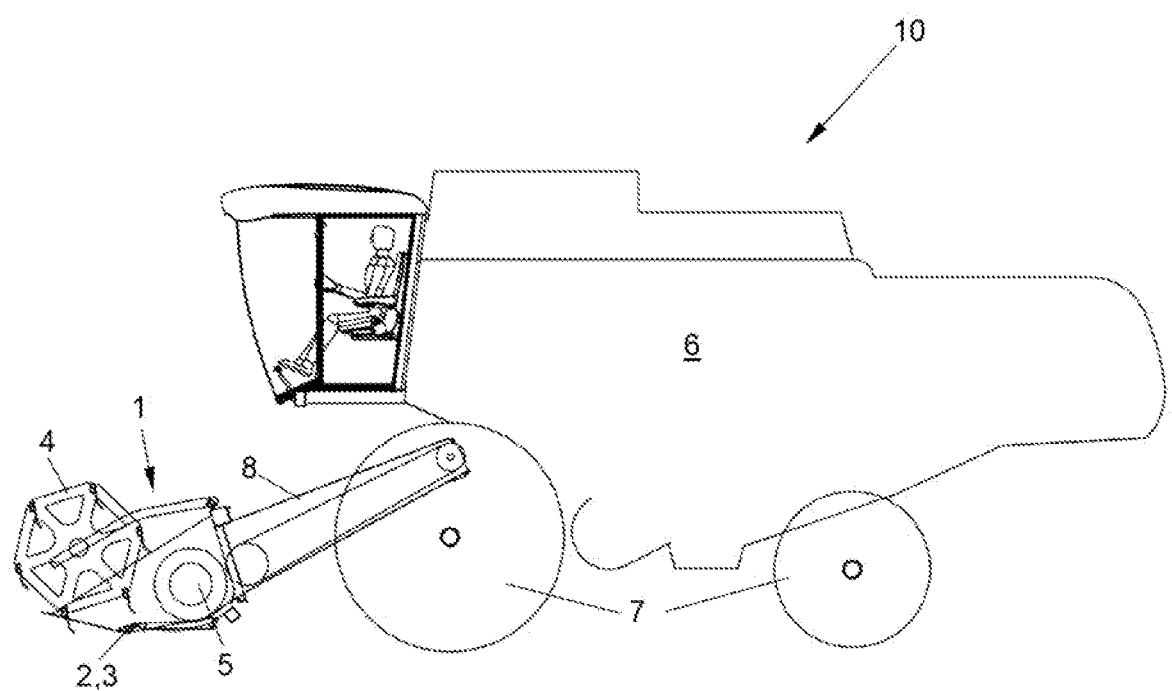
FIG. 1 is a schematic image of a combine harvester, illustrating the position of the knives and cutterbar at the front of the combine header.

FIG. 1 is a schematic image of a combine harvester 10 as known today, comprising a header 1 mounted at the front of the combine 10. The position of the knives 2 and the cutterbar 3 is indicated in the drawing, without distinguishing these elements (more detailed drawings will be referred to later). The knives and the cutterbar are maintained at a given height above ground level while the combine moves through a field of crops that are to be harvested. A rotating reel 4 guides the crops towards the knives. Cut crops are transported from both lateral sides of the header 1 towards a central area by an auger 5. The main body 6 of the combine is supported by front and rear wheels 7 and comprises the threshing rotors and a cleaning section generally known by the skilled reader and not depicted as such in FIG. 1. From the central area of the header 1, crops are transported into the main body 6 of the combine by a feeder 8, also known as such and not described here in detail.

Figure 2:
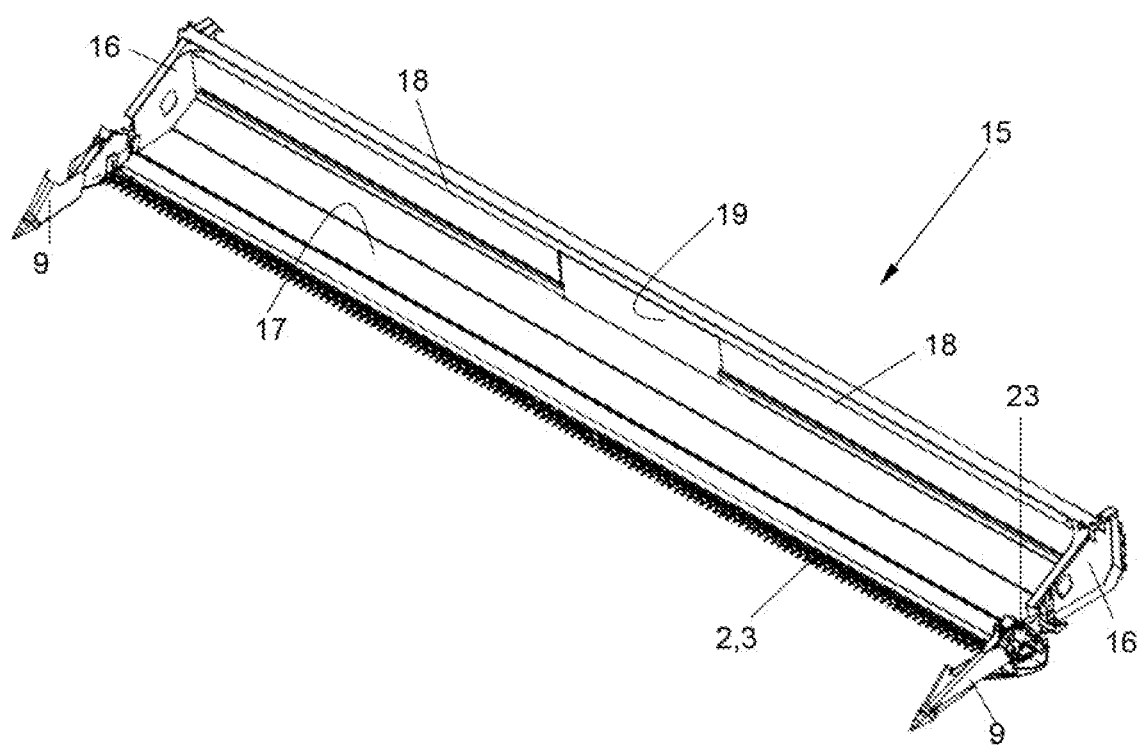
FIG. 2 shows a header frame provided with a cutting system in accordance with an embodiment of the invention.
Figure 3:
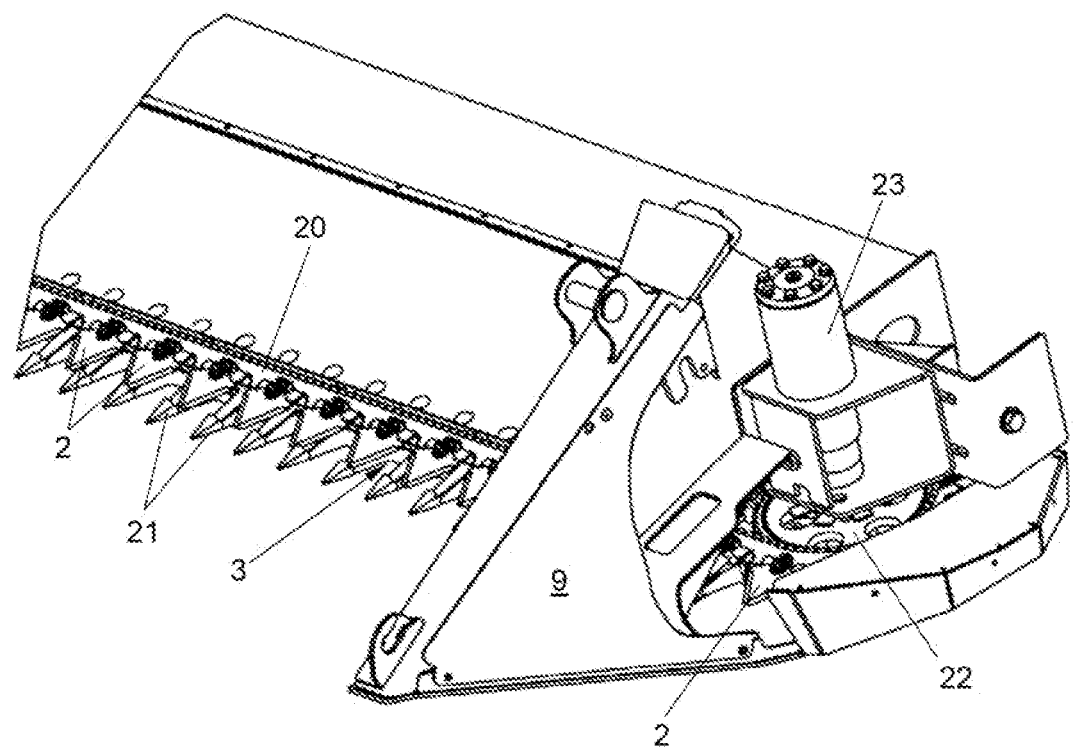
FIG. 3 is a detail of the frame shown in FIG. 2.

An image of a header frame 15 provided with a cutting system in accordance with an embodiment of the invention is shown in FIG. 2. The frame 15 comprises sidewalls 16, a header floor 17 and a back wall 18. The back wall comprises a central opening 19 through which crops are transferred to the feeder, when the header is attached thereto. The knives 2 and the cutterbar 3 extend between laterally placed dividers 9 along the full length of the header, at the front edge of the header floor 17. FIG. 3 is a detailed image of one side of a header frame similar to the frame of FIG. 2 (only the shape of the dividers 9 is slightly different). In this image, the knives 2 and the cutterbar 3 can be clearly distinguished. The term 'cutterbar' is used herein to refer to an assembly of elements which are rigidly connected together, as will be described in more detail later in this text, with reference to FIG. 10. The cutterbar 3 comprises counterknife fingers 21 protruding in the forward direction. The knives 2 are attached to a belt 20, so that they are able to move continuously past the stationary fingers 21 of the cutterbar 3, to thereby cut crop stalks in the field. The belt 20 is guided by a pair of pulleys 22, at least one of which is driven actively by a belt drive mechanism comprising an actuator 23. The details of the drive mechanism for the belt 20 are not shown, nor are they relevant for defining the scope of the present invention. Any suitable mechanism, for example known from loop-knife cutting systems that are in use today, is applicable. The actuator 23 may for example be a hydraulic motor or an electric motor, coupled to a respective hydraulic or electric power source of the combine harvester.

As stated in the previous section, the invention is related to the attachment of the knives 2 to the belt 20 or to any equivalent belt-type carrier, wherein the knives are coupled to said carrier through a support bracket and a reversible force coupling. A number of embodiments of such force couplings are described hereafter. These embodiments do not limit the scope of the invention and further alternatives are possible.

A first embodiment is illustrated in FIG. 4a, showing just one knife 2 and its attachment to the belt 20 when the knife is in the standard operational position for cutting crops. In this position, the knife 2 oriented forward so that its cutting edge cooperates with the counterknife fingers of the cutterbar. These fingers are not shown in the drawing in order not to obstruct the view of the knife attachment. The direction of the belt motion is indicated by an arrow. The knife attachment is shown from different angles in FIGS. 4b and 4c. The knife 2 is a double-edged triangular knife, as commonly used in a combine header. It is pivotably attached to a support bracket 25 that is itself fixed to the sidewall of the belt 20. Different shapes of this support bracket are possible, but in this particular case, the bracket 25 is formed of a cut and bent steel plate element, comprising a wall portion 26 that is maintained against the sidewall of the belt 20 by bolt connections 27, and a platform portion 28 that protrudes away from the wall portion 26 and from the sidewall of the belt 20, at an angle a little under 90° so that the knife 2 is inclined slightly downward. The angle could also be a right angle. The bolt connections 27 are of a type that does not interrupt the pattern of teeth 29 on the interior wall of the belt 20. Such bolt connections are known in the art and need not be described here in detail.

The platform portion 28 comprises a central opening, through which a rotation axle 30 is inserted that equally protrudes through an opening in the knife body, so that the knife 2 is pivotable about the central axis 24 of the axle 30, relative to the platform portion 28 of the support bracket 25. As seen in FIGS. 4b and 4c, the axle 30 is the shaft portion of a bolt 31 that is inserted through central openings provided in a leaf spring 32 and in a retention block 33 mounted underneath the platform portion 28 of the bracket 25. A nut 34 is screwed onto the threaded end of the axle 30 to thereby clamp the leaf spring 32 and the retention block 33 against the underside of the platform portion 28 of the bracket 25. As seen in FIG. 4c, the retention block 33 comprises a thinner central area and thicker lateral areas, with the outer ends of the leaf spring 32 lodged against the thicker lateral areas. The leaf spring 32 is not rotatable relative to the retention block 33, which is realized in the embodiment shown by providing the block 33 with lip portions 38 which block any such relative rotation. The retention block 33 is furthermore provided with diametrically opposed slanted clutch portions 35 that interlock with similarly shaped clutch portions 36 of a holding element 37 that is rigidly fixed to the underside of the platform portion 28. The holding element 37 could also be integral with the platform portion 28. The nut 34 is tightened on top of the knife 2, with the interposition of a washer 14, thereby pulling the central portion of the leaf spring 32 towards the platform portion 28 while the outer ends of the spring 32 remain lodged against the thicker lateral areas on both sides of the retention block 33. In this way, the leaf spring 32 is pre-loaded by a predefined spring force, biasing the retention block 33 against the holding element 37, with the clutch portions 35/36 in an interlocked state, as shown in FIGS. 4b and 4c.

The knife 2 is not rotatable relative to the retention block 33. This may be achieved for example by providing the retention block 33 with a flange portion that protrudes upwards and interlocks with the opening through the knife. This is not visible and hidden by the washer 14 in FIGS. 4a to 4c. The flange portion and the opening in the knife 2 may be provided with corresponding sections, for example in the shape of a polygon or a truncated circle in order to obstruct any relative rotation of the knife 2 relative to the block 33.

In the position shown in FIGS. 4a to 4c, the interlocked clutch portions 35 and 36 combined with the spring force, are sufficient to obstruct any rotation of the knife 2 about rotation axis 24 due to lateral forces exerting a torque on the knife as a consequence of the cutting of plant stalks or the occurrence of small objects in the path of the knife. However, the spring force is set at an appropriate level so that when a larger obstruction is encountered, the torque exerted on the knife by such an obstruction is capable of overcoming the spring force, thereby allowing the knife 2 to pivot about the central axis 24 of the axle 30.

This brings the knife 2 towards a non-operational position, illustrated in FIGS. 5a and 5b. It is seen that the knife 2 has pivoted to one side under the influence of the obstruction. As the block 33 and the spring 32 are not rotatable relative to the knife, these elements have undergone the same pivoting movement. The obstruction has exerted a torque on the knife 2 that is high enough to enable the clutch portions 35 of the retention block 33 to slide past the clutch portions 36 of the holding element 37, forcing the retention block 33 in the downward direction, against the spring force exerted by the leaf spring 32, i.e. bending the leaf spring further downward. This is illustrated in FIGS. 6a and 6b, showing a side view of the mechanism in the normal and pivoted positions respectively. Once the clutch portions 35/36 are no longer interlocking, the retention block 33 is able to rotate relative to the holding element 37. Therefore the knife 2, the retention block 33 and the spring 32 rotate as a single body relative to the bracket 25, thereby bringing the knife into the pivoted position. The bolt 31 and the nut 34 may remain stationary during the rotation of the knife 2, or these elements may equally rotate together with the knife 2, depending on the friction forces between the bolt 31 and the spring 32 on the one side and between the nut 34, the knife 2 and the washer 14 on the other side. Preferably a suitable securing mechanism is applied to the nut 34 once the required pre-tension of the spring 32 is set in order to avoid that the nut 34 is involuntarily rotated relative to the bolt 31 during the pivoting motion, which would loosen the connection between the knife 2 and the bracket 25.

This pivoting of the knives 2 safeguards the knives against breaking as a consequence of excessive lateral forces exerted on the knives, while the knives are maintained in their operational positions as long as lateral forces remain below a predefined level. In this way, the invention provides a solution to the problems described above. After encountering an obstruction that pivots one or more knives away from their operational position, these knives may be pivoted back manually after a harvesting run, or automatically by a suitable reset system, an example of which will be described further in this text.

In the embodiment shown in FIGS. 4a to 4c, the clutch portions 35/36 block the rotation of the knife 2 in one direction only, unless a large enough obstruction is encountered. In the other direction, the knife's rotation is not blocked, as the clutch portions 35 and 36 are interlocking only along one edge. This means that the system shown is applicable only for movement of the knives 2 in one direction, which is the direction indicated in FIG. 4a.

According to another embodiment, the clutch portions of the retention block 33 and of the holding element 37 are double-sided, i.e. blocking the rotation in both directions during normal cutting action, and allowing the pivoting of the knife 2 when a large obstruction is encountered, regardless of the direction of travel of the knives. This embodiment can be applied in combination with a belt movement in the direction shown in FIG. 4a as well as in the opposite direction.

Another embodiment is illustrated in FIGS. 7a to 7d, with FIGS. 7a and 7b showing the operational position of the knife 2 and FIGS. 7c and 7d showing the pivoted position. The support bracket 25 is once again visible and has the same form as in the previous embodiment. In this embodiment, the connection between the retention block 33 and the holding element 37 is not realized by a clutch assembly, but by a pair of latch pins 55 which are integral with the upper surface of the retention block 33, and which are fitted into corresponding seat portions (not shown) in the underside of the holding element 37, when the knife is in the operational position. As illustrated in FIGS. 7c and 7d, the shape of the latch pins 55 is such that sliding of the pins 55 out of the seat portions is possible provided that a sufficient torque is applied. This minimum torque is once again determined by the clamping force exerted by the pre-tensioned leaf spring 32, mounted in the same way as in the previous embodiment, i.e. secured by means of the bolt 31 and nut 34. It is clear that this mechanism works in the two directions. The protrusions 55 are able to slide out of the seat portions regardless of the direction of the force exerted by an obstruction. This embodiment is therefore applicable regardless of the direction of movement of the belt 20.

Figure 8A:
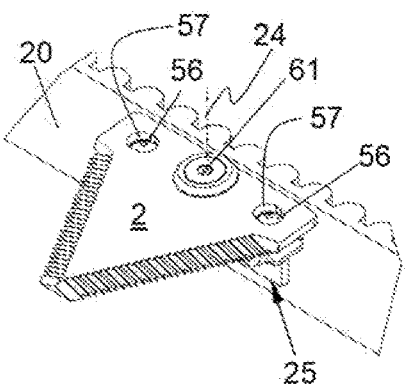
FIGS. 8a and 8b illustrate a third embodiment of a knife attachment in accordance with the invention.
Figure 8B:
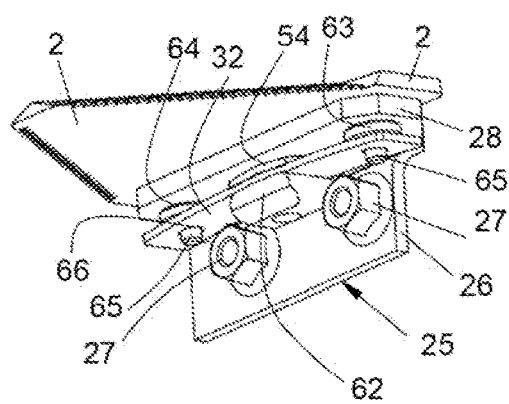

Yet another embodiment involving a leaf spring is illustrated in FIGS. 8a and 8b. This embodiment also includes latch pins 56, which are now however inserted into openings 57 provided in the knife 2 itself, on either side of the pivot axis 24. The support bracket 25 again comprises a wall portion 26 attached to the sidewall of the belt 20 by bolt connections 27, and a platform portion 28 extending outward from the belt 20. The knife 2 is rotatably mounted on the platform portion 28, being able to rotate about the pivot axis 24 defined by a central bolt 61. The bolt 61 is screwed into a protruding block portion 62 that is fixed to or integral with the wall portion 26 of the bracket 25. The leaf spring 32 is mounted between the underside of the platform portion 28 and the protruding block portion 62, preferably with a distancing plate 54 therebetween. The latch pins 56 have a larger-diameter portion 63 ending in a rounded tip, the larger-diameter portions 63 being slidably inserted in openings 64 provided in the platform portion 28 of the bracket 25, with the rounded tips partially inserted in the openings 57 provided in the knife 2. The pins 56 furthermore have a smaller-diameter portion 65 inserted in openings 66 provided in the leaf spring 32 on either side of the rotation axis 24. When the leaf spring 32 is not stressed, the knife 2 is at a distance from the upper surface of the platform portion 28. When the central bolt 61 is tightened, the knife is forced towards the platform portion 28 and the pins 56 are pushed down against the spring force, until the spring 32 is bent downward to a given degree, preferably corresponding to the knife being pulled tight against the upper surface of the platform portion 28. In this condition, the spring 32 exerts a clamping force on the knife 2 by forcing the tips of the pins 56 into the openings 57, thereby obstructing rotation of the knife 2 when cutting plant stalks and encountering small objects. The clamping force is such that it cannot be overcome unless a torque of a predefined magnitude or higher is exerted on the knife, which may occur when a large obstruction is encountered in the field, forcing the latch pins 56 to disengage from the openings 57 in the knife 2, and be pushed further down against the spring force, thereby enabling the knife 2 to pivot about the axis 24 towards the non-operational position.

Figure 9A:
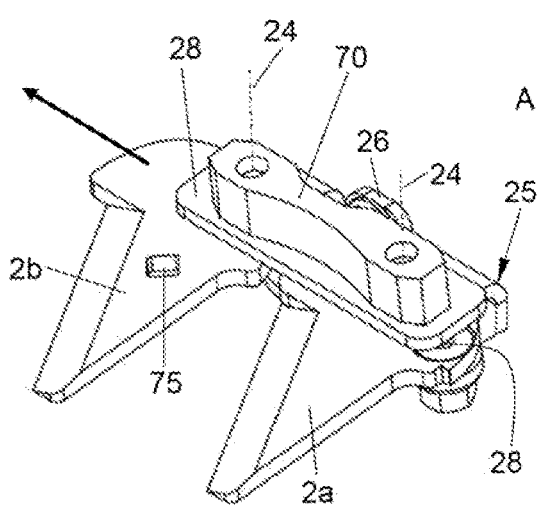
FIGS. 9a to 9d illustrate a fourth embodiment, wherein two knives are attached to a belt by way of an overcenter mechanism.
Figure 9B:
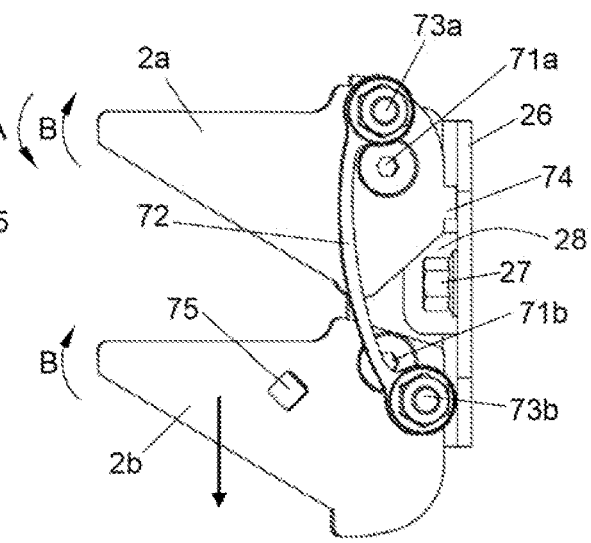
Figure 9C:
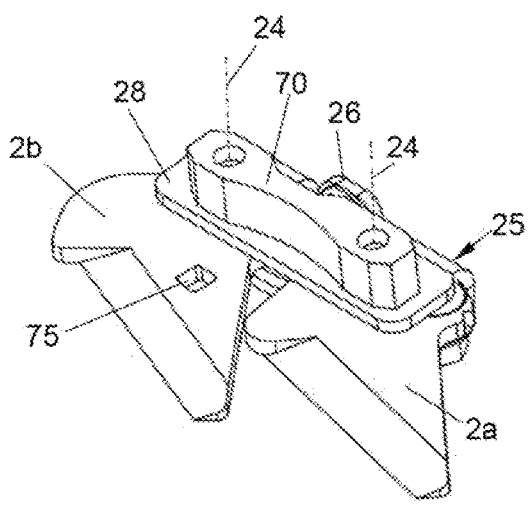
Figure 9D:
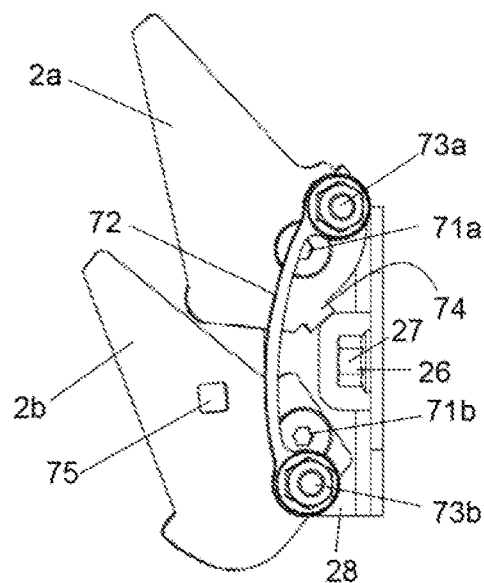

FIGS. 9a to 9d illustrate an embodiment wherein the clamping force on the knives is not realized by a pre-tensioned spring but by an overcenter mechanism. The mechanism works on two knives mounted on the same support bracket 25. The bracket 25 has a similar shape to the bracket shown in the first embodiment, having a wall portion 26 configured to be bolted to the sidewall of the belt (not shown), and a platform portion 28, provided this time with two openings for allowing the passage of the two pivot axes 24 of the respective first and second knife 2a and 2b. The knives have only one cutting edge, as this embodiment is configured to work only for one single belt direction, indicated by the arrow in FIGS. 9a and 9b. These FIGS. 9a and 9b show the normal operational position of the knives, while FIGS. 9c and 9d show the pivoted position of the knives. The knives 2a and 2b are mounted underneath the platform portion 28 in this case, with a support element 70 mounted above the platform portion 28. This support element 70 has the function of maintaining the belt against a support wall (not shown).

As best seen in the view from the bottom in FIG. 9b, the knives 2a and 2b are pivotable relative to the platform portion 28 about respective pivots 71a and 71b (coinciding with the axes 24). An overcenter linkage 72 is rotatably coupled to the two knives, at two further pivots 73a and 73b respectively. The first knife 2a is provided with a stopper protrusion 74 at the back, that obstructs rotation of the first knife 2a in direction A (see FIG. 9b), when the knives are in the normal operational position. In this position, the pivots are in an overcenter position, with the pivot 73b secured against the sidewall 26 of the bracket 25, thereby locking the knife 2a in its operational position during normal operation of the knives.

The overcenter lock obstructs rotation of the knife 2a in the direction B, i.e. clamping both knives against a lateral force exerted by crops or small objects. The overcenter lock can be released however by lifting up the overcenter linkage 72, which can be done by pivoting the second knife 2b in the direction B by exerting a sufficiently high torque. This torque is determined by the judicious design of the pivot locations, which are chosen so that the overcenter lock remains intact unless a force of a predefined level or higher is applied, for example when a large obstruction is encountered. When this happens, the lateral force overcomes the clamping force and the overcenter lock is released, thereby enabling both knives to pivot towards the non-operational position shown in FIGS. 9c and 9d. To bring the knives back towards the operational position, the second knife 2b must be pivoted back manually. A slot 75 is preferably provided in the second knife, allowing the passage of a ratchet tool that allows exerting the considerable force required to bring the knives back to the operational position.

Other types of overcenter-based systems are possible within the scope of the invention. It would be possible for example to provide each knife with its own overcenter linkage that is releasably attached to a point of the bracket 25, so that the linkage is released only by a sufficiently large lateral force.

Figure 10:
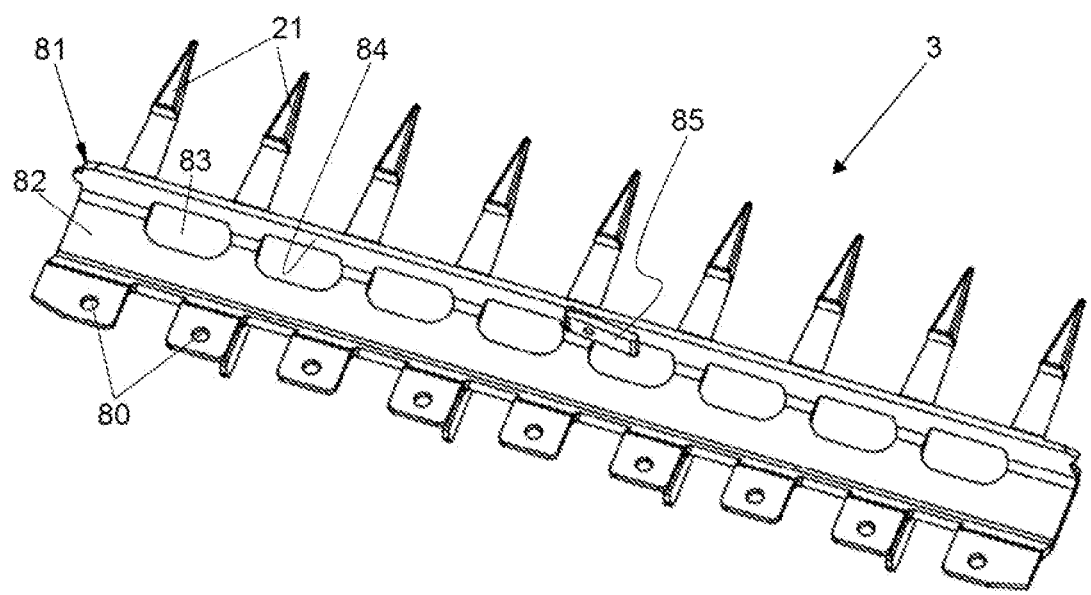
FIG. 10 illustrates a cutterbar in accordance with an embodiment of the invention, and provided with a cam for resetting the knives from the pivoted position to the normal operational position.
Figure 11:
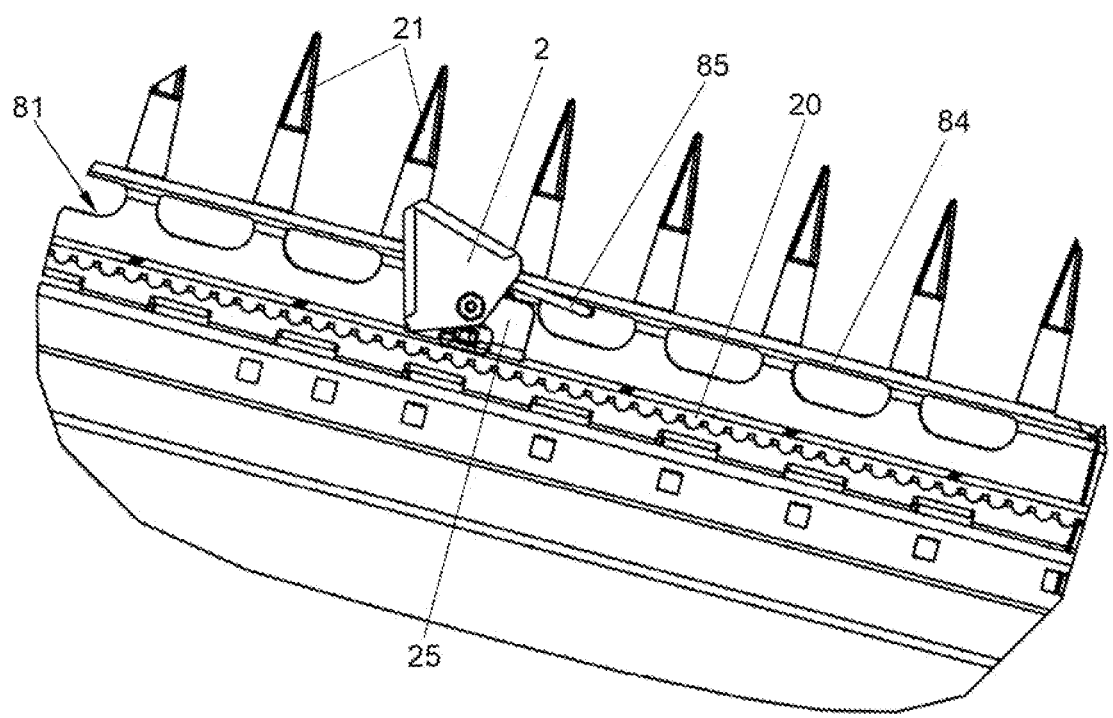
FIG. 11 illustrates the operation of the cam for resetting the knives from the pivoted to the operational position.

FIG. 10 illustrates a cutterbar 3 that may be used in a loop-knife cutting system of the invention. The cutterbar 3 comprises the counterknife fingers 21 which are to be fixed to a carrier structure (not shown) by bolt connections through the holes 80. The fingers 21 are maintained at a fixed relative distance from each other by a guard plate 81 that is fixed to or forms an integral piece with the counterknife fingers 21, and that comprises a horizontal portion 82 provided with openings 83, and a vertically upstanding edge 84 along the front of the horizontal portion 82. A cam element 85 is attached to the inside of this upstanding edge 84. As seen in FIG. 11, the cam element 85 is configured to interact with the attachment mechanism of a knife 2 that has been forced into the pivoted position by a large obstruction encountered in the field, so that the knife 2 is automatically reset to its operational position through the interaction with the cam element 85. The knife mechanism shown in FIG. 11 is the mechanism illustrated in FIGS. 4a to 4c, provided with the retention block 33, the holding element 37 and the leaf spring 32 underneath the support bracket 25 to which the knife 2 is rotatably coupled. The cam element 85 extends away from the wall of the upstanding edge portion 84 to such a degree that this cam element 85 enters into contact with the pivoted retention block 33, forcing this retention block to pivot back towards its operational position illustrated in FIGS. 4a to 4c, and bringing the knife 2 back as well, given that the knife and the retention block 33 are not rotatable relative to each other. Preferably several cam elements 85 are arranged along the full length of the cutterbar, so that pivoted knives are able be automatically re-set back to their operational position as fast as possible after encountering a large obstruction. This reduces the loss of intake by the header of crop that is not cut when knives are pivoted.

The cam element 85 may be attached to the guard plate 81 by a connection that allows setting the degree to which the cam element 85 extends away from the upstanding edge 84 of the guard plate 81. This may be a mechanism as known in the art, comprising an adjustable screw for setting the position of the cam element 85 with a high precision, in the order of a few tens of a millimetre for example. This allows adjusting the cam element's position to small dimensional changes of the cutting mechanism due to wear or particular external influences such as extreme weather conditions.

The cam element 85 shown in FIG. 11 is designed to reset the knives when they travel in one direction only. According to an embodiment, cam elements are provided that allow resetting the knives also when travelling in the opposite direction. This may be done by providing an additional cam element that is oppositely inclined compared to the cam element 85 shown in the drawings.

The cam element 85 is one example of a more general 'reset' element that may be incorporated in the cutterbar 3 to reset the position of a pivoted knife. Another example of such a reset element is a strong magnet that interacts with the force coupling of a pivoted knife, for example exerting a sufficiently strong pulling force on the pivoted retention block 33 to bring this block back into its operational position. Another alternative reset element may be a wheel that is dimensioned so as to interact with the retention block 33. The wheel and magnet may be configured to allow resetting the knives regardless of the direction of travel of the belt 20.

As stated above, the invention is not limited to the knife attachments shown in the drawings. Other types of spring-operated mechanisms may be used than the ones shown in FIGS. 4 to 8. For example in the embodiments involving the retention block 33, this block could be biased against the holding element 37 by linear springs mounted between a rigid holding plate and the block 33, the holding plate being pivotable together with the springs and the retention block 33 about the rotation axis 24.

Further alternatives exist in terms of the releasable interface in conjunction with the spring-operated mechanisms described above. Said interface could for example consist of a pair of friction plates pressed together by the pre-loaded spring, so that the plates are non-pivotable relative to each other unless one of the plates is subjected to at least the predefined torque required to release the interface.

In the wording of the appended claims, each knife 2 of a cutting system according to the invention is coupled to the support bracket 25 by a reversible force coupling, several examples of which have been described above. In the embodiments shown in FIGS. 4 to 8, each knife is coupled to the bracket by its own dedicated force coupling. The invention is however not limited to this, but also includes embodiments wherein two adjacent knives are pivotably coupled to the same bracket 25 and wherein only one of these two knives is directly coupled to the bracket via a reversible force coupling, for example a spring-operated coupling as described in FIGS. 4 to 8. The second of the two knives is connected to the first by a link that forces the two knives to pivot simultaneously out of and back into their operational positions. The second knife can therefore be said to be indirectly coupled to the bracket by the reversible force coupling while the first knife is directly coupled thereto by said reversible force coupling. A further example of an indirectly force-coupled knife is the knife 2b in the embodiment of FIGS. 9a to 9d.

In any of the above-described embodiments, a support element similar to element 70 in FIG. 9a may be incorporated in order to rest against a vertical wall (not shown), thereby ensuring that the knives 2 are not pushed inward by the counterpressure exerted by the crops during a harvesting run.

In the embodiments of FIGS. 4 to 8, such a support element is not shown, but a suitable support surface may be realized for example by attaching an additional plate element to the support bracket 25 or by shaping the support bracket in such a way that it comprises a vertical portion extending upward.

The invention is related to the cutting system as such, as well as to a header equipped with a cutting system according to the invention, as well as to any agricultural implement equipped with the cutting system. This may for example be combine harvester provided with a detachable header that is equipped with the cutting system, or a mowing machine provided with the cutting system, or a tractor equipped with the cutting system or with a header provided with the cutting system.

What is claimed is:

1. A cutting system configured to be driven through a field in a forward direction in order to cut plant stalks at a given distance from the ground, the cutting system comprising:
   (i) a belt-type carrier configured to be guided by a set of pulleys, so as to move in a direction transversal to the stalks, wherein a plurality of knives are attached to a lateral surface of the carrier,
   (ii) a cutterbar provided with a plurality of counterknives configured to remain stationary relative to the knives as the knives move past the counterknives, to thereby cut the stalks,
   each knife being attached to the carrier through a support bracket, the support bracket comprising a wall portion that is fixed to the carrier and a platform portion extending outward from the carrier,
   each knife being pivotably coupled to the platform portion of the bracket,
   each knife being pivotable about a rotation axis, which is substantially perpendicular to the platform portion, between an operational position in which the knife is oriented in a forward direction and a non-operational position in which the knife is pivoted away from the forward direction,
   the knife being coupled to the bracket by a reversible force coupling that (i) maintains the knife in the operational position when the knife is cutting plant stalks, and (ii) requires a predefined torque in order to disengage the coupling and thereby allow the knife to pivot about the rotation axis towards the non-operational position, and
   (iii) at least one reset element that is configured to interact with the reversible force couplings of the knives to thereby automatically reset the knives from the non-operational position back to the operational position.

2. The cutting system according to claim 1 wherein the reversible force coupling comprises at least one spring configured to apply a spring force that maintains the knife in said operational position unless a lateral force is executed that results in a torque higher than the predefined torque.

3. The cutting system according to claim 2, wherein the spring is a leaf spring mounted underneath the platform portion of the bracket, wherein a releasable retention mechanism is mounted between the leaf spring and the knife and wherein the spring force is generated by inserting a shaft of a bolt through a central opening of the leaf spring, through an opening in the platform portion and through an opening in the knife, and by tightening a nut onto the end of the shaft, thereby activating the releasable retention mechanism so that said releasable retention mechanism maintains the knife in the operational position.

4. The cutting system according to claim 3, wherein the retention mechanism comprises a retention block that is non-rotatably connected to the knife, and that is coupled to the platform portion of the bracket or to a holding element fixed thereto by a releasable interface that requires the retention block to be pushed downward against the spring force in order for the interface to be released.

5. The cutting system according to claim 4, wherein the releasable interface comprises slanted clutch portions which interlock when the knife is in the operational position, and which are forced to slide past each other when the knife is pivoted towards the non-operational position.

6. The cutting system according to claim 4, wherein the releasable interface comprises latch pins having rounded tips which are inserted in corresponding seat portions when the knife is in the operational position, and which are forced to slide out of the seat portions when the knife is pivoted towards the non-operational position.

7. The cutting system according to claim 3, wherein the retention mechanism comprises latch pins having rounded tips which are inserted into openings disposed in the knife on either side of the rotation axis, said latch pins being slidably inserted in openings disposed in the platform portion of the bracket, said pins being furthermore maintained in the openings of the knife by the leaf spring when the knife is in the operational position.

8. A cutting system configured to be driven through a field in a forward direction in order to cut plant stalks at a given distance from the ground, the cutting system comprising:
- a belt-type carrier configured to be guided by a set of pulleys, so as to move in a direction transversal to the stalks, wherein a plurality of knives are attached to a lateral surface of the carrier, and
- a cutterbar provided with a plurality of counterknives configured to remain stationary relative to the knives as the knives move past the counterknives, to thereby cut the stalks,
- each knife being attached to the carrier through a support bracket, the support bracket comprising a wall portion that is fixed to the carrier and a platform portion extending outward from the carrier,
- each knife being pivotably coupled to the platform portion of the bracket,
- each knife being pivotable about a rotation axis, which is substantially perpendicular to the platform portion, between an operational position in which the knife is oriented in a forward direction and a non-operational position in which the knife is pivoted away from the forward direction,
- the knife being coupled to the bracket by a reversible force coupling that (i) maintains the knife in the operational position when the knife is cutting plant stalks, and (ii) requires a predefined torque in order to disengage the coupling and thereby allow the knife to pivot about the rotation axis towards the non-operational position,
- wherein the first and second knife of any pair of adjacent knives are pivotably coupled to the same support bracket,
- wherein said reversible force coupling acts directly on the first of said pair of adjacent knives, and
- wherein the second of said pair of adjacent knives is coupled to the first knife through a link that allows only a simultaneous pivoting motion of the first and second knife about their respective rotation axes.

9. A cutting system configured to be driven through a field in a forward direction in order to cut plant stalks at a given distance from the ground, the cutting system comprising:
- a belt-type carrier configured to be guided by a set of pulleys, so as to move in a direction transversal to the stalks, wherein a plurality of knives are attached to a lateral surface of the carrier, and
- a cutterbar provided with a plurality of counterknives configured to remain stationary relative to the knives as the knives move past the counterknives, to thereby cut the stalks,
- each knife being attached to the carrier through a support bracket, the support bracket comprising a wall portion that is fixed to the carrier and a platform portion extending outward from the carrier,
- each knife being pivotably coupled to the platform portion of the bracket,
- each knife being pivotable about a rotation axis, which is substantially perpendicular to the platform portion, between an operational position in which the knife is oriented in a forward direction and a non-operational position in which the knife is pivoted away from the forward direction,
- the knife being coupled to the bracket by a reversible force coupling that (i) maintains the knife in the operational position when the knife is cutting plant stalks, and (ii) requires a predefined torque in order to disengage the coupling and thereby allow the knife to pivot about the rotation axis towards the non-operational position,
- wherein the force coupling comprises an overcenter mechanism.

10. The cutting system according to claim 9, wherein two adjacent knives are pivotably connected to the platform portion of a single bracket, and wherein an overcenter link is furthermore pivotably coupled to the two adjacent knives at pivot points which are located such that the knives are locked into the operational position unless a lateral force is applied to at least one of the two knives, said lateral force resulting in a torque that is equal to or higher than the predefined torque.

11. The cutting system according to claim 1, wherein the reset element is a cam element and wherein the reversible force coupling comprises a retention block, configured to interact with the cam element to thereby reset the knife back to the operational position.

12. The cutting system according to claim 11, wherein a position of the cam element is adjustable.

13. A header for an agricultural implement comprising the cutting system according to claim 1.

14. A combine harvester comprising the cutting system according to claim 1.

* * * * *